(12) United States Patent
Chlandová et al.

(10) Patent No.: US 12,168,628 B2
(45) Date of Patent: Dec. 17, 2024

(54) FIRE-PROOF INSULATION MATERIAL AND A METHOD FOR ITS PRODUCTION

(71) Applicant: FIRST POINT A.S., Hodonin (CZ)

(72) Inventors: Gabriela Chlandová, Borohrádek (CZ); Petr Španiel, České Meziříči (CZ)

(73) Assignee: First Point A.S., Hodonin (CZ)

( * ) Notice: Subject to any disclaimer, the term of this patent is extended or adjusted under 35 U.S.C. 154(b) by 518 days.

(21) Appl. No.: 17/627,665

(22) PCT Filed: Jun. 26, 2020

(86) PCT No.: PCT/CZ2020/000031
§ 371 (c)(1),
(2) Date: Jan. 15, 2022

(87) PCT Pub. No.: WO2021/023321
PCT Pub. Date: Feb. 11, 2021

(65) Prior Publication Data
US 2022/0259099 A1    Aug. 18, 2022

(30) Foreign Application Priority Data

Aug. 6, 2019    (CZ) .................................. CZ2019-509

(51) Int. Cl.
| | |
|---|---|
| C04B 14/04 | (2006.01) |
| C04B 14/42 | (2006.01) |
| C04B 20/10 | (2006.01) |
| C04B 28/26 | (2006.01) |
| C04B 40/00 | (2006.01) |
| C04B 111/28 | (2006.01) |

(52) U.S. Cl.
CPC .............. *C04B 14/04* (2013.01); *C04B 14/42* (2013.01); *C04B 20/1055* (2013.01); *C04B 28/26* (2013.01); *C04B 40/0046* (2013.01); *C04B 2111/28* (2013.01)

(58) Field of Classification Search
CPC ..... C04B 14/04; C04B 14/42; C04B 20/1055; C04B 28/26; C04B 40/0046; C04B 2111/28; C04B 20/1092; C04B 2111/20; C04B 14/14
See application file for complete search history.

(56) References Cited

U.S. PATENT DOCUMENTS

| | | | |
|---|---|---|---|
| 5,242,494 | A | 9/1993 | Callaghan et al. |
| 10,344,484 | B2 | 7/2019 | Moennig et al. |
| 2006/0272542 | A1 | 12/2006 | Horner, Jr. et al. |
| 2009/0140097 | A1 | 6/2009 | Collier et al. |
| 2013/0015389 | A1 | 1/2013 | Torres-Aranda, Jr. |

FOREIGN PATENT DOCUMENTS

| | | |
|---|---|---|
| CA | 1064200 A | 10/1979 |
| CN | 101164881 B | 9/2010 |
| CN | 102964107 A | 3/2013 |
| CN | 103923295 A | 7/2014 |
| CN | 105153827 A | 12/2015 |
| CN | 103351679 B | 2/2016 |
| CN | 106630909 A | 5/2017 |
| CN | 106747220 A | 5/2017 |
| CN | 106810879 A | 6/2017 |
| CN | 107254103 A | 10/2017 |
| CN | 107352549 A | 11/2017 |
| CN | 107501766 A | 12/2017 |
| CN | 109437818 A | 3/2019 |
| CN | 109879643 A | 6/2019 |
| CZ | 19902151 A3 | 3/1992 |
| CZ | 310398 A3 | 6/1999 |
| CZ | 201537 A3 | 2/2016 |

(Continued)

OTHER PUBLICATIONS

U.S. Appl. No. 17/624,835, filed Jan. 4, 2022, Ms. Gabriela Chlandová, Entire Document.

(Continued)

*Primary Examiner* — Anthony J Green
(74) *Attorney, Agent, or Firm* — Austin LLP

(57) ABSTRACT

A fire-proof insulation material, in particular a fire-proof insulation material, which is composed of a harden-able compound which contains 19 to 40 wt % of porous glass balls, 60 to 81 wt % of an aqueous solution of sodium silicate having a density in the range of 1370 to 1400 kg/m³ and a molar ratio of $SiO_2$ to $Na_2O$ in the range of 3.2 to 3.4, and 0.1 to 1 wt % water glass binder stabiliser, while further containing 2 to 10 wt % of chopped basalt fibre, and the surface of the porous glass balls having a diameter of 0.3 to 1 mm is provided with carbon black, the carbon black constituting 0.1 to 0.9 wt % of total weight. A method for producing a fire-proof insulating material, in particular a method for producing a fire-proof insulation material, according to which firstly the porous glass balls are mixed with an aqueous carbon black solution so that their entire surface is coated with carbon black, then the porous balls with carbon black are mixed with chopped basalt fibre and mixed to form an insulation compound, and a water glass stabiliser is added to the aqueous sodium silicate solution and then a hardener is added to this solution, then the solution is stirred for 1 to 10 minutes to form a binder solution, and then the thermal insulation compound is poured into the binder solution while constantly stirring, and the whole is mixed, and then the resulting mixture is poured into the application site.

6 Claims, No Drawings

(56) References Cited

FOREIGN PATENT DOCUMENTS

| | | | |
|---|---|---|---|
| CZ | 29896 | U1 | 10/2016 |
| CZ | 29941 | U1 | 11/2016 |
| CZ | 30925 | U1 | 8/2017 |
| CZ | 31095 | U1 | 10/2017 |
| CZ | 31096 | U1 | 10/2017 |
| CZ | 31184 | U1 | 11/2017 |
| CZ | 31269 | U1 | 12/2017 |
| CZ | 31398 | U1 | 1/2018 |
| CZ | 31596 | U1 | 3/2018 |
| CZ | 2017127 | A3 | 5/2018 |
| DE | 4038132 | C1 | 6/1992 |
| DE | 19738373 | A1 | 3/1999 |
| DE | 102005040091 | A1 | 3/2007 |
| DE | 102012220176 | A1 | 6/2013 |
| DE | 102014002594 | A1 | 8/2015 |
| DE | 202015103555 | U1 | 8/2015 |
| EP | 0004846 | A1 | 10/1979 |
| EP | 0396076 | A1 | 11/1990 |
| EP | 0620246 | A1 | 10/1994 |
| EP | 1431354 | A1 | 6/2004 |
| FR | 2048393 | | 3/1971 |
| FR | 2274580 | A1 | 1/1976 |
| GB | 1260439 | A | 1/1972 |
| JP | H11139819 | A | 5/1999 |
| KR | 100997914 | B1 | 12/2010 |
| KR | 101644957 | B1 | 8/2016 |
| RU | 2010117476 | A | 11/2011 |
| RU | 2545287 | C1 | 3/2015 |
| RU | 2652683 | C1 | 4/2018 |
| RU | 2687816 | C1 | 5/2019 |
| SU | 1432028 | A1 | 10/1988 |
| WO | 2007023091 | A1 | 3/2007 |
| WO | 2008145599 | A1 | 12/2008 |
| WO | 2012019988 | A1 | 2/2012 |
| WO | 2014042987 | A3 | 12/2014 |
| WO | 2018130699 | A1 | 7/2018 |
| WO | 2018210605 | A1 | 11/2018 |

OTHER PUBLICATIONS

U.S. Appl. No. 17/624,838, filed Jan. 4, 2022, Ms. Gabriela Chlandová, Entire Document.
U.S. Appl. No. 17/625,089, filed Jan. 5, 2022, Ms. Gabriela Chlandová, Entire Document.
U.S. Appl. No. 17/627,654, filed Jan. 15, 2022, Ms. Gabriela Chlandová, Entire Document.
U.S. Appl. No. 17/627,665, filed Jan. 15, 2022, Ms. Gabriela Chlandová, Entire Document.
U.S. Appl. No. 17/627,667, filed Jan. 15, 2022, Ms. Gabriela Chlandová, Entire Document.
U.S. Appl. No. 17/627,669, filed Jan. 15, 2022, Ms. Gabriela Chlandová, Entire Document.
Abstract for SU1432028 listed in Database WPI, Week 198927, Derwent World Patents Index, vol. 1989, No. 27, Database accession No. 1989-199122, XP002799847.
International Search Report for PCT/CZ2020/000018, [2020].
International Search Report for PCT/CZ2020/000019, [2020].
International Search Report for PCT/CZ2020/000021, [2020].
International Search Report for PCT/CZ2020/000023, [2020].
International Search Report for PCT/CZ2020/000031, [2020].
International Search Report for PCT/CZ2020/000032, [2020].
International Search Report for PCT/CZ2020/000033, [2020].
Search Report for Priority Application PV 2019-445, [2020].
Search Report for Priority Application PV 2019-446, [2020].
Search Report for Priority Application PV 2019-448, [2020].
Search Report for Priority Application PV 2019-507, [2020].
Search Report for Priority Application PV 2019-509, [2020].
Search Report for Priority Application PV 2019-511, [2020].
Search Report for Priority Application PV 2019-515, [2020].
Written Opinion for PCT/CZ2020/000018.
Written Opinion for PCT/CZ2020/000019.
Written Opinion for PCT/CZ2020/000021.
Written Opinion for PCT/CZ2020/000023.
Written Opinion for PCT/CZ2020/000031.
Written Opinion for PCT/CZ2020/000032.
Written Opinion for PCT/CZ2020/000033.

FIRE-PROOF INSULATION MATERIAL AND A METHOD FOR ITS PRODUCTION

CROSS-REFERENCE TO RELATED APPLICATIONS

This application is a U.S. National Stage under 35 U.S.C. § 371 of International Application No. PCT/CZ2020/000031, filed on Jun. 26, 2020, which claims priority to the Czech Republic patent application No. PV 2019-509 filed on Aug. 6, 2019 and entitled "Fire-Proof Insulation Material and a Method for its Production." The disclosure of each of these applications is incorporated by reference herein for all purposes.

TECHNICAL FIELD

The invention relates to a fire-proof insulation material, in particular a fire-proof insulation material consisting of a compound which contains water glass, and to a method for its production.

STATE OF THE ART

From current technology, a whole range of mortar and concrete mixtures are known, which are used not only as common building materials, but are used for fire protection and for thermal insulation of buildings as well.

Among known expanded insulation masonry materials can be listed, for example, polystyrene concrete. It's base is expanded polystyrene balls of various sizes with a diameter of 2 to 6 mm. These balls are surface treated to remain separate to eliminate electrostatic attraction. Polystyrene concrete is applied to horizontal surfaces similarly to concrete or is made into panels.

From the patent document CZ PV 2003-2196 a mortar for the top layer of plaster is known, intended as a sound-absorbing and fire-resistant layer, which contains perlite as a filler and as an insulator, bentonite. The disadvantage of this mortar is that bentonite has low fire-proofing and thermal insulation properties. A further disadvantage is that bentonite has high absorption and swells in water, which is why it is not suitable as an external plaster.

From a further patent document RU 2687816 is known an expanded concrete with perlite and kaolin wool, cellulose and silicate fibre. The disadvantage is that this material does not have significant fire-proofing properties, it also has low mechanical strength and is brittle.

From the patent document CZ PV 2004-536 a masonry material is known, the binder of which is an ash solution. The filler is slag, clays, crushed quartz and limestone. The material is reinforced with steel wires. The disadvantage is that it is not an insulating material. Another disadvantage is that it is relatively absorbent.

From another patent document CZ PV 1990-6611 is known a masonry and cladding material with a binder in the form of soluble cellulose and a dispersion. This material contains water glass, which here however does not fulfil the function of a binder, but is an additive. In addition to the basic ground filler, granular polystyrene or perlite is added. The disadvantage of this material is that it has low thermal and sound insulation properties, while not even being fire-proof.

From the utility model CZ 23529 a geo-polymer based on slag and water glass is known. The water glass is treated with sodium hydroxide. They add ceramic balls to lighten it. The disadvantage is that this material is heavy, has no heat resistance and is relatively absorbent.

From a further patent document CN102964107 is known a panel composed of perlite, glass fibres, clay and silica gel, where the main binder is clay. The disadvantage is that the panel has low thermal insulation properties, is absorbent and is not fire-proof.

From the utility model CZ 31096 a compound for a permeable fire-proof expanded thermal insulation system based on glass is known, which contains glass balls with a thermal stability of up to 1000° C. The disadvantages are lower compressive strength and lower heat resistance.

From the aforementioned current technology it is clear that main disadvantage of current technology is that the known materials have low heat and fire resistance, while at the same time they are often very absorbent.

The object of the invention is to construct a fire-proof thermal insulation material which will have a high fire resistance, while at the same time having excellent insulating properties.

Principle of the Invention

These mentioned drawbacks are largely eliminated and the objects of the invention are fulfilled by a fire-proof insulating material, in particular a compound for fire-proof insulating material containing water glass, which according to the invention is characterised by that it consists of a hardening compound which contains 19 to 40 wt % of porous glass balls, 60 to 81 wt % of an aqueous solution of sodium silicate which has a density in the range of 1370 to 1400 kg/m$^3$ and a molar ratio of $SiO_2$ to $Na_2O$ in the range of 3.2 to 3.4, and 0.1 to 1 wt % water glass binder stabiliser, while further comprising 2 to 10 wt % of chopped basalt fibre, and the surface of the porous glass balls which have a diameter of 0.3 to 1 mm is provided with carbon black, the carbon black constituting 0.1 to 0.9 wt % of total weight. The advantage of this insulating material is high fire resistance and excellent insulating properties. This insulating material also has excellent anti-fungal effects and is environmentally friendly. The advantage of this fire-proof insulation material is significantly high fire resistance and excellent insulating properties. The advantage of using an aqueous solution of sodium silicate is that the resulting material has excellent gluing and sealing effects. Its heat resistance is over 1000° C. After hardening, it has the form of glass, so it is hard enough, strong and water resistant, and at the same time it is even vapour permeable. The ratio of molar masses of silica to sodium oxide and the associated density of the solution and the concentration of the solution have a significant effect on the rheological properties of water glass as a polymer mixture, on the electrical properties, compressibility and adhesive strength as in an electrolyte, further to hardness, strength, etc. The advantage of the above stated parameters is that the resulting insulating material is partially flexible and pliable after solidification. The advantage of providing the surface of the porous glass balls with carbon black is that the carbon black thus provided does not increase thermal conductivity, with the carbon black to advantage enveloping the porous glass balls, thereby increasing radiation impermeability.

The basalt fibre to advantage has a length of 6 mm and a thickness of 0.014 mm. The fibres are flexible, highly strong and flexible, have low thermal conductivity, high thermal resistance, are water resistant and chemically resistant to alkalis, acids and organic solvents, have a high sound absorption coefficient, and are non-flammable.

It is also to great advantage if the porous glass balls contain 12 to 16 wt % aluminium oxide. Thanks to this, they have greater heat resistance and are very hard, chemically and mechanically resistant as well. Because they have a purely inorganic origin, they are ecological and harmless to health. As opposed to conventional glass balls, they can withstand temperatures of up to 1,400° C. At the same time, unlike, for example, ceramic balls, they are thin-walled, contain a large amount of air and are therefore an excellent thermal insulator.

It is also to advantage that the water glass stabilisers are hydrophilic alkoxy alkyl-ammonium salts.

The fire-proof insulation material to further advantage contains a water glass hardener. The advantage is that it is possible to optimise the hardening speed.

The mentioned disadvantages are largely removed and the objectives of the invention are fulfilled by a method for producing fire-proof insulating material, specifically a method for producing fire-proof insulating material containing water glass, which according to the invention is characterised by that firstly the porous glass balls are mixed with an aqueous carbon black solution in such a way that their entire surface is coated, then the porous glass balls with carbon black are mixed with chopped basalt fibre and mixed to form a thermal insulation compound, and a water glass stabiliser is added to the aqueous sodium silicate solution and then a hardener is added to this solution, then the solution is stirred for 1 to 10 minutes to form a binder solution, and then the thermal insulation compound is poured into the binder solution while constantly stirring, and the whole is mixed, and then the resulting mixture is poured into the application site, and the resulting mixture is left undisturbed until hardened.

It is to further advantage that the application site is a mould. The advantage is that it is possible to easily produce a product with precise parameters.

The main advantage of the fire-proof insulation material and the method for its production according to the invention is that the resulting material has excellent fire-proof and insulation properties, while at the same time being permeable and relatively light as well. The advantage is also that the water glass used ensures the non-flammability of the whole compound. A further advantage is that the combination of glass balls, basalt fibres, carbon black and sodium silicate-water glass-creates a material that is simultaneously very hard and strong, resistant to high pressure. It is non-flammable while having heat-resistant properties comparable to fireclay or dinas earth (silica). At the same time, it is a purely inorganic and therefore ecological and harmless material. It can be used similarly as a compound for expanded concrete, as a floor filling, etc., or it can be used after it has dried and hardened to make panels and blocks. These can be used as masonry material or they can be used to thermally insulate or protect existing masonry.

EXAMPLES OF THE PERFORMANCE OF THE INVENTION

Example 1

The fire-proof insulation material is composed of a harden-able compound which contains 30 wt % of porous glass balls, 64 wt % of aqueous sodium silicate solution, and 0.5 wt % water glass binder stabiliser.

The fire-proof insulation material further contains 5 wt % chopped basalt fibre.

The porous glass balls have a diameter of 0.5 mm and contain 15 wt % aluminium oxide.

The surface of the porous glass balls is provided with carbon black, the carbon black constituting 0.5 wt % of total weight.

The water glass stabilisers are hydrophilic alkoxy alkyl-ammonium salts, in the form of a 98% aqueous solution of N,N,N',N'-Tetrakis (2-hydroxypropyl) ethylenediamine.

The fire-proof insulation material further contains a water glass hardener, which is a compound of pure glycerol diacetate/triacetate in a ratio of 7:3 parts by volume, with a concentration of 2 wt % to pure water glass.

The aqueous sodium silicate solution has a density of 1380 kg/m$^3$ and the molar ratio of $SiO_2$ to $Na_2O$ is 3.3.

According to the method for producing the insulating material, firstly the porous glass balls are mixed with an aqueous carbon black solution in such a way that their entire surface is coated, then the porous glass balls with carbon black are mixed with chopped basalt fibre and mixed to form a thermal insulation compound, and a water glass stabiliser is added to the aqueous sodium silicate solution and then a hardener is added to this solution, then the solution is stirred for 5 minutes to form a binder solution, and then the thermal insulation compound is poured into the binder solution while constantly stirring, and the whole is mixed, and then the resulting mixture is poured into the application site, which is a silicon mould and the resulting mixture is left undisturbed until hardened. The carbon black is added to the compound in the form of an aqueous solution with a concentration of 25 wt %.

Example 2

The fire-proof insulation material is composed of a harden-able compound which contains 37 wt % of porous glass balls, 60 wt % of aqueous sodium silicate solution, and 0.9 wt % water glass binder stabiliser.

The fire insulation material further contains 2 wt % chopped basalt fibre. The porous glass balls have a diameter of 1 mm and contain 12 wt % aluminium oxide.

The surface of the porous glass balls is provided with carbon black, the carbon black constituting 0.1 wt % of total weight.

The water glass stabilisers are hydrophilic alkoxy alkyl-ammonium salts, in the form of a 98% aqueous solution of N,N,N',N'-Tetrakis (2-hydroxypropyl) ethylenediamine.

The fire insulation material further comprises a water glass hardener, which is a compound of pure glycerol diacetate/triacetate in a ratio of 7:3 parts by volume, with a concentration of 0.5 wt % to pure water glass.

The aqueous sodium silicate solution has a density of 1370 kg/m$^3$ and the molar ratio of $SiO_2$ to $Na_2O$ is 3.2.

According to the method for producing the insulating material, firstly the porous glass balls are mixed with an aqueous carbon black solution in such a way that their entire surface is coated, then the porous glass balls with carbon black are mixed with chopped basalt fibre and mixed to form a thermal insulation compound, and a water glass stabiliser is added to the aqueous sodium silicate solution and then a hardener is added to this solution, then the solution is stirred for 1 minute to form a binder solution, and then the thermal insulation compound is poured into the binder solution while constantly stirring, and the whole is mixed, and then the resulting mixture is poured into the application site, which is a silicon mould and the resulting mixture is left undisturbed until hardened. The carbon black is added to the compound in the form of an aqueous solution with a concentration of 25 wt %.

Example 3

The fire-proof insulation material is composed of a harden-able compound which contains 19 wt % of porous glass balls, 70 wt % of aqueous sodium silicate solution, and 0.1 wt % water glass binder stabiliser.

The fire insulation material further contains 10 wt % chopped basalt fibre.

The porous glass balls have a diameter of 0.5 mm and contain 16 wt % aluminium oxide.

The surface of the porous glass balls is provided with carbon black, the carbon black constituting 0.9 wt % of total weight.

The water glass stabilisers are hydrophilic alkoxy alkyl-ammonium salts, in the form of a 98% aqueous solution of N,N,N',N'-Tetrakis (2-hydroxypropyl) ethylenediamine.

The fire-proof insulation material further comprises a water glass hardener, which is a compound of pure glycerol diacetate/triacetate in a ratio of 7:3 parts by volume, with a concentration of 5 wt % to clear water glass.

The aqueous sodium silicate solution has a density of 1400 kg/m$^3$ and the molar ratio of SiO$_2$ to Na$_2$O is 3.4.

According to the method for producing the insulating material, firstly the porous glass balls are mixed with an aqueous carbon black solution in such a way that their entire surface is coated, then the porous glass balls with carbon black are mixed with chopped basalt fibre and mixed to form a thermal insulation compound, and a water glass stabiliser is added to the aqueous sodium silicate solution and then a hardener is added to this solution, then the solution is stirred for 10 minutes to form a binder solution, and then the thermal insulation compound is poured into the binder solution while constantly stirring, and the whole is mixed, and then the resulting mixture is poured into the application site, which is a silicon mould and the resulting mixture is left undisturbed until hardened. The carbon black is added to the compound in the form of an aqueous solution with a concentration of 25 wt %.

INDUSTRIAL APPLICATION

The fire-proof insulation material according to the invention has a wide range of applications, specifically in the construction industry. For example, it can be used as a replacement for expanded concrete for levelling floors and ceilings with minimal construction load and as a fire-proof, thermal and water resistant insulation. Furthermore, it is possible to produce panels or blocks from it, serving as thermal insulation, fire-proof, permeable and anti-fungal masonry material or as cladding on existing masonry.

The invention claimed is:

1. A fire-proof insulation material, comprising a harden-able compound which comprises 19 to 40 wt % of porous glass balls having a diameter of 0.3 to 1 mm, 60 to 81 wt % of an aqueous solution of sodium silicate having a density in the range of 1370 to 1400 kg/m$^3$ and a molar ratio of SiO$_2$ to Na$_2$O in the range of 3.2 to 3.4, and 0.1 to 1 wt % water glass binder stabilizer, while further comprising 2 to 10 wt % of chopped basalt fiber, and wherein the surface of the porous glass balls is provided with carbon black, wherein the carbon black is in the range of 0.1 to 0.9 wt % of total weight.

2. The fire-proof insulation material according to claim 1, wherein the porous glass balls comprise 12 to 16 wt % aluminum oxide.

3. The fire-proof insulation material I according to claim 1, wherein the water glass stabilizers are hydrophilic alkoxy alkyl-ammonium salts.

4. The fire-proof insulation material according to claim 1, wherein the material further comprise a water glass hardener.

5. A method for producing a fire-proof insulation material according to claim 1, wherein in a first step the porous glass balls are mixed with an aqueous carbon black solution so that their entire surface is coated with carbon black, then the porous glass balls with carbon black are mixed with chopped basalt fiber and mixed to form a thermal insulation compound, and in a second step a water glass stabilizer is added to the aqueous sodium silicate solution, then a hardener is added to this solution, and the solution is stirred for 1 to 10 minutes to form a binder solution, after which the thermal insulation compound of the first step is poured into the binder solution of the second step while constantly stirring, and the resulting mixture is mixed, and then the resulting mixture is poured into the application site, and, the resulting mixture is left undisturbed until hardened.

6. The method for producing a fire-proof insulating material according to claim 5, wherein the application site is a mould.

* * * * *